Re 6862 1-18-1876
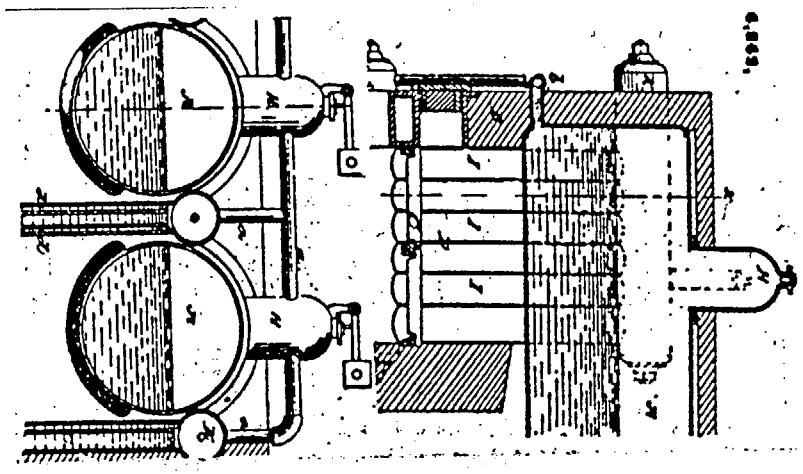

BEST AVAILABLE COPY

UNITED STATES PATENT OFFICE.

JOSEPH A. MILLER, OF PROVIDENCE, RHODE ISLAND.

IMPROVEMENT IN STEAM-GENERATORS.

Specification forming part of Letters Patent No. 62,494, dated February 26, 1867; Reissue No. 6,862, dated January 18, 1876; application filed November 19, 1875.

*To all whom it may concern:*

Be it known that I, JOSEPH A. MILLER, formerly of the city, county, and State of New York, but now of the city and county of Providence, State of Rhode Island, have invented certain new and useful Improvements in Steam-Generators; and I do hereby declare that the following is a full, clear, and exact description of the same, reference being had to the accompanying drawings, forming part of this specification.

Figure 1 represents a transverse section of two cylindrical steam-boilers, having my improvement applied to the same. Fig. 2 is a longitudinal section of the same, showing part of the boiler and a view of my improved side of the fire-box. Figs. 3, 4, and 5 are transverse sections, on an enlarged scale, of some of the boxes, pipes, or tubes, arranged round or on either side of the fire box or chamber, under different forms of construction.

Similar letters of reference indicate corresponding parts.

The object of this invention is to utilize more thoroughly the heat produced by the combustion of fuel than has been heretofore possible in steam-boilers in which only a portion of the shell projects horizontally over the fire box or chamber, as is the case in the ordinary cylinder, return-flue, or tubular boilers, having a cylindrical shell, a portion of which extends over the fire.

Another object of this invention is to protect the brick-work surrounding the fire from the direct heat-rays of the same, by interposing auxiliary steam-generating boxes or chambers between the fire and such brick-work.

This invention consists in the combination, with one or more boilers or steam-generators of cylindrical or other form, arranged to project horizontally over a fire box or chamber, of a series of pipes, tubes, or boxes, forming auxiliary steam-generators, arranged to intercept and absorb the radiated heat from the fire, having their lower part connected with the water-space, and their upper part with the steam-space of the steam generator or generators proper.

The invention further consists in providing such pipes, tubes, or boxes with partitions or diaphragms, so as to form ascending or descending water-passages, open at their ends, so as to separate the ascending from the descending currents, and thus facilitate the separation of the steam and insure the circulation of the water.

In the drawings, A A are horizontal cylindrical boilers, arranged parallel to each other, of which there may be one, two, or more. These boilers may be of any length or diameter. They may be plain cylinder, return-flue, or tubular boilers, set in suitable brick-work B. C C are the grate-bars; D D, the fire-boxes or combustion-chambers, provided with doors and ash-pits.

These boilers may be provided with steam-domes H H, or they may be without the same.

I I I are a series of pipes, tubes, or boxes, arranged around or on the sides of the fire, so as to intercept the radiated heat from the same, the lower part extending below the grate, and the upper part above the water-line of the boilers, or thereabout, and connected by suitable pipes with the water and steam of the boiler or boilers. These pipes, tubes, or boxes may be of any desired shape, not being necessarily cylindrical, as here represented.

C C are partitions or diaphragms, the object of which is to divide the interior of the pipes, tubes, or boxes into separate ducts or passages, so as to form films of water exposed to the fire and return water-spaces not exposed to the direct rays of the fire, the passages *d* forming steam-generators proper, the fire acting upon the same to the exclusion of the passages *e*, the steam passing off freely from their upper ends into the steam-space of the boiler, without having to force its way through a large body of superincumbent water, while the other passages *e* will be comparatively free from steam and serve as return water-ducts. These auxiliary pipes, tubes, or boxes I I I, beside being connected with the steam and water spaces of the boilers, are also connected with suitable blow-off pipes *g*, provided with valves or cocks, as shown in the drawings, arranged at or near their lower ends, so that all sediment or impurities may be blown out from time to time. The heat produced by the combustion of coal under a steam-boiler consists of fifty per cent. radiated heat and fifty per cent. of heat given out to the air supporting combustion. Only a small portion of the first half can be absorbed by the boiler extending over the fire, as there is but little surface to absorb the same, there being a limit to the amount of heat that can be transmitted through a boiler-plate in a given time. The convex surface of the boiler over the fire is not favorable to collect the radiated heat, and the fire-brick lining is a poor medium to reflect the same. The larger portion of the first half of the heat resulting from the combustion of the fuel, is therefore absorbed in destroying the fire-brick lining of the furnace rather than the generation of steam, causing a large loss both in fuel and in the cost of repairs by the renewal of the brick-work, amounting to considerable sums annually on a single boiler.

By surrounding the fire with my auxiliary pipes, tubes, or boxes, and thus presenting a large amount of surface to the direct rays of the fire, the interior of which pipes, tubes, or boxes is connected with both the steam and water of the boiler or boilers, so that the water will be on the same level in both, and the steam formed can freely escape to the boiler, the radiated heat is all utilized in making steam, and the brick-work protected against its injurious action, thus causing large saving in fuel and repairs.

In such boilers as the ordinary multitubular boiler, having a cylindrical shell and set in brick-work in the usual manner, a large amount of surface is used to utilize the heat given out to the air supporting combustion, while a very small portion—usually less than three per cent. of the total surface—is exposed to the radiated heat near the fire.

As the efficiency of the heating-surface in a steam-generator depends on its position with reference to the fire, and as my auxiliary surface contained in the pipes, tubes, or boxes is in close proximity to the fire, exposing a large amount of surface to the desired rays of the burning fuel, these pipes, tubes, or boxes add materially to the efficiency of the steam-boiler, producing economy in fuel, by utilizing all, or nearly all, the radiated heat.

Having thus described my invention, I claim as new and desire to secure by Letters Patent—

1. The combination, with the cylindrical-shell boiler or boilers A A, arranged to extend over the fire, of the auxiliary pipes, tubes, or boxes, placed so as to intercept the radiated heat, and connected with the steam and water spaces of the boiler or boilers, substantially as and for the purpose specified.

2. The combination, with the boilers A A—one or more of them—of the tubes, pipes, or boxes I, with their diaphragms K, forming steam-generating spaces *d* and return water-passages *e*, arranged in relation to the fire-grate and the steam and water spaces of the boiler, substantially as and for the purpose described.

3. In combination with one or more boilers arranged to extend over the fire, the auxiliary steam-generators, arranged to form the sides of the fire-box or the partition between two furnaces, extending below the grate-line and above the water-line in the boiler, or thereabout, and connected with the steam and water space of the boiler or boilers, substantially as and for the purpose set forth.

4. The combination, with one or more cylindrical-shell boilers, of auxiliary steam-generating pipes, tubes, or boxes, surrounding the fire, and connected, with suitable pipes, with the steam and water spaces of the boiler, and provided with the blow-off pipe *g*, connected with the lower part of the same, substantially as and for the purpose specified.

5. The combination of the mud-drums placed below the grate and the steam-drum K placed above the water-line, with the tubes or pipes connecting the same when placed on the sides of a fire-grate, or between two grates, as described.

JOSEPH A. MILLER.

Witnesses:
THOMAS C. CONNOLLY,
WILLIAM G. BUDLONG.